United States Patent [19]

Cannon

[11] Patent Number: 5,163,718
[45] Date of Patent: Nov. 17, 1992

[54] HOSE AND HOLLOW MEMBER ARRANGEMENTS WITH LIP SEAL

[75] Inventor: David W. C. Cannon, Dorking, Great Britain

[73] Assignee: Thermopol Limited, West Sussex, Great Britain

[21] Appl. No.: 725,159

[22] Filed: Jul. 3, 1991

[30] Foreign Application Priority Data

Jul. 9, 1990 [GB] United Kingdom ............... 9015062

[51] Int. Cl.$^5$ ............................................. F16L 17/00
[52] U.S. Cl. .................................... 285/236; 285/110; 285/235; 285/363; 285/231; 285/226
[58] Field of Search ............... 285/236, 226, 231, 110, 285/363, 235

[56] References Cited

U.S. PATENT DOCUMENTS

| 3,087,745 | 3/1959 | Rumbell | 285/236 |
| 3,861,721 | 1/1975 | Berghofer | 285/236 |
| 4,726,611 | 2/1988 | Sauer | 285/236 |

FOREIGN PATENT DOCUMENTS

| 311296 | 4/1989 | European Pat. Off. | |
| 831533 | 2/1952 | Fed. Rep. of Germany | 285/235 |
| 702989 | 1/1954 | United Kingdom | 285/236 |
| 768326 | 2/1957 | United Kingdom | 285/236 |

2139723 11/1984 United Kingdom .

Primary Examiner—Randolph A. Reese
Assistant Examiner—Timothy Aberle
Attorney, Agent, or Firm—Robbins, Dalgarn, Berliner & Carson

[57] ABSTRACT

A hose (1) and hollow member (2) arrangement in which the hose is fittable at its end over the hollow member. The hose (1) has an inner wall and an annular recess (3) in this wall for receiving an annular projection (10) of the hollow member, and beyond this recess (3) in the direction away from the end of the hose a lip seal (4) extending circumferentially all around the inner wall of the hose. The lip seal (4) extends away from the inner wall obliquely in the direction away from the end of the hose (1) and is disposed for engaging the end face of the hollow member (2) with a gap (9) left between opposing faces of the inner wall of the hose (1) and the lip seal (4). When assembled, a fastener (12) secured around the end portion of the hose (1) holds the hose fast against the hollow member (2). This fastener (12) is fitted at a zone of the hose (1) nearer to the end of the hose then the recess (3) so that the radial securing force does not act on the lip seal (4) which is therefore unaffected by this securing force. It is the lip seal (4) that seals against internal pressure that acts on the lip seal to reinforce the sealing action of this seal.

5 Claims, 1 Drawing Sheet ns with another hollow member, the action upon this 60
HOSE AND HOLLOW MEMBER ARRANGEMENTS WITH LIP SEAL

BACKGROUND OF THE INVENTION

FIELD OF THE INVENTION

This invention relates to hose and hollow member arrangements. The invention is particularly concerned with flexible hoses and hollow members to which they are to be fitted for use in turbocharged motor vehicle engine installations.

It has been required to provide more power in vehicles as permitted vehicle weights have increased over the years. A well known method of doing this is to turbo- charge the engine so that air under pressure is supplied to the cylinders to provide more complete combustion and more power than is available by taking air into the cylinder at atmospheric pressure. Air delivered to the engine by a turbocharger has its temperature raised considerably because the turbocharger is driven by engine exhaust gases and the heat from these passes to the turbocharger compressor portion which delivers the air to the engine. This heating effect reduces the engine efficiency somewhat so that not all of the extra power theoretically available is achieved. To combat this intercooling has been used. This entails passing the turbocharged engine intake air at its higher pressure and temperature through a heat exchanger where it is cooled before it is introduced into the engine cylinder for combustion.

It is very common for turbocharger and intercooler interconnections and connections to the engine intake system to be made by silicone rubber hoses. This allows relative movement to be economically accommodated and also allows the easy achievement of complex hose shapes which are sometimes necessary due to overall engine compartment design considerations. These silicone rubber hoses are fitted over parallel metal pipework both on the turbocharger and intercooler and on the engine intake system and are secured with worm drive clamps and clips.

As higher power outputs are sought from existing engines, the turbocharged air pressures are increasing. Typical current values of 1-2 bar (gauge) may be increased to 3-4 bar (gauge) and even higher. At these elevated pressures the previous method of fixing using worm drive clamps becomes unreliable and leads to excessive amounts of leakage. Merely increasing the torque of the fixing will not reduce the leakage as it will lead to damage of the hose which in turn can lead to increased leakage.

DESCRIPTION OF THE PRIOR ART

Patent specification GB 2 139 723 A discloses a flexible hose in which a slit lying oblique to the hose axis is formed around the inner wall of one end of the hose. One of the cut faces of this slit constitutes a surface facing in a direction having an axial component whereby when the hose end is the female member of a joint with another hollow member, the action upon this surface of fluid pressure within the bore of the hose tends to cause the internal radius of the hose adjacent the surface to diminish so that the hose grips the other member more firmly. This firmer pressure is achieved only when the installation is under pressure. At other times the hose is retained on the other member either by virtue of its fit on the other member alone, or by the action of a clip. Such a clip becomes necessary where the connection between the hose and the other member has to resist relative movement between the hose and the other member at all times and not only when the hose is under full internal pressure, but it is essential that the presence of the clip should have no adverse effect on the pressure-receiving surface mentioned above. In GB 2 139 723 A the clip overlaps the slit which provides the pressure-receiving surface so that tightening of the clip to any significant extent will interfere with the desired operation of the pressure-receiving surface, and even damage the part of the hose defining this surface. Pending U.S. patent application Ser. No. 07/512,697, now abandoned, relates to a flexible hose for mounting over a hollow member, the hose having an inner wall and a lip seal extending circumferentially all around the inner wall of the hose, said lip seal extending away from the inner wall obliquely in the direction away from an adjacent end of the hose, the lip seal being disposed between abutments extending radially inwardly from the inner wall of the hose for engagement with the hollow member, the lip seal projecting further radially into the interior of the hose than the abutments so as to be pushed radially outwardly by the hollow member with a gap left between opposing faces of the inner wall of the hose and the lip seal when the hose is mounted on the hollow member with the abutments engaged with the hollow member, the hose being a convoluted hose and each abutment protruding from the inner wall of the hose being formed by a convolution of the hose. With this hose mounted on a hollow member a worm drive clamp or other fastening can be tightened around the hose end portion to hold the abutments fast against the hollow member and thus to secure the hose against axial displacement relative to the hollow member. This radial securing force acts through the abutments and the seal is protected, by the abutments, from interference by, or damage from, the radial securing force and it is the lip seal that seals against internal pressure that acts on the lip seal to reinforce its sealing action.

SUMMARY OF THE INVENTION

According to the present invention there is provided a hose and hollow member arrangement in which the hose is fittable at its end over the hollow member, the hose having an inner wall and an annular recess in this inner wall for receiving an annular projection of the hollow member, and beyond this recess in the direction away from said end of the hose a lip seal extending circumferentially all around the inner wall of the hose, said lip seal extending away from the inner wall obliquely in the direction away from said end of the hose, the lip seal being disposed for engagement with the end face of the hollow member with a gap left between opposing faces of the inner wall of the hose and the lip seal when the hose is mounted on the hollow member with the annular projection of the hollow member engaged in the recess of the hose. In this arrangement the positive location of the hose end on the hollow member when the hose is fitted to the hollow member, effected by the engagement of the hollow member projection in the hose recess, assists with correct location of the hose on the hollow member. Furthermore where two hollow members are joined by the hose (as hereinafter described) the hollow members can move relatively to each other to an extent determined by flexing of the hose but the engagement of the hollow member projections in the hose recesses serves to prevent movement of the hoses on the hollow members. Securing of hose end to hollow member is effected by tightening a worm drive clamp or other fastening around the hose end portion at a zone nearer the end of the hose than the hose recess so that the radial securing force does not act on the seal and it is the lip seal that seals against internal pressure that acts on the lip seal to reinforce its sealing action.

BRIEF DESCRIPTION OF THE DRAWING

For a better understanding of the invention and to show how the same may be carried into effect, reference will now be made, by way of example, to the accompanying drawing, in which.

DESCRIPTION OF THE PREFERRED EMBODIMENTS

Figure 1:
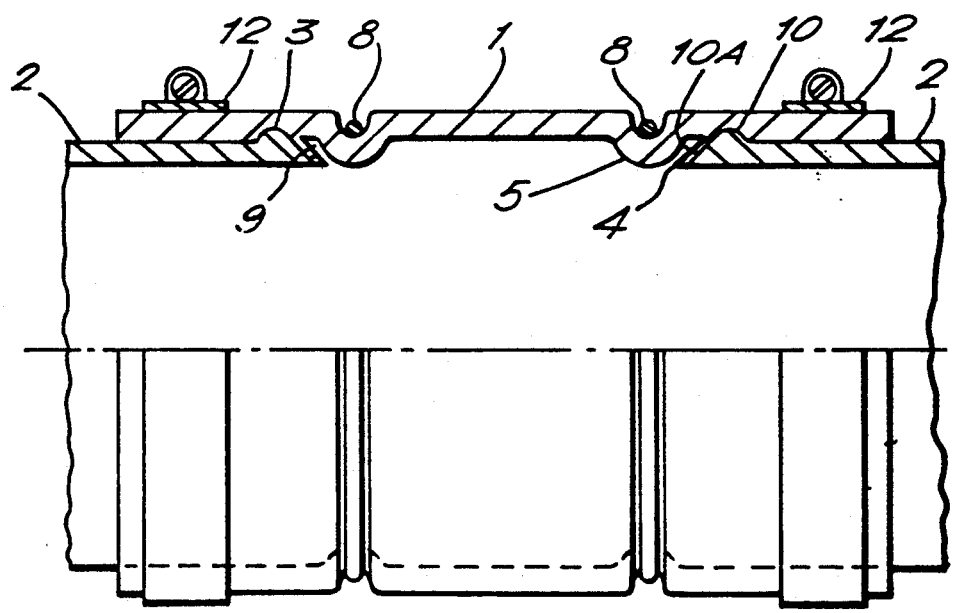
FIG. 1 is a side view half in section of a hose with a first form of sealing arrangement, shown connected at each end to a hollow member in a female/male relationship.
Figure 2A:
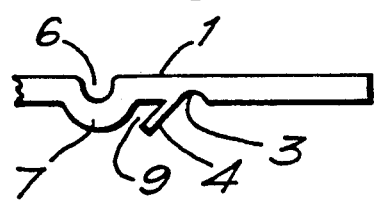
FIG. 2A is a sectional view of one end wall of the hose of FIG. 1, and FIGS. 2B, 2C, and 2D are views similar to FIG. 1 of alternative forms.

Referring first to FIGS. 1 and 2A, the hose 1 is a spiral wrapped flexible hose. Each end of the hose is fitted, as a female member, onto a hollow parallel-sided length of pipe 2.

Near each of its ends the hose 1 is provided internally with an annular recess 3. On the side of each recess 3 remote from the adjacent open end of the hose there is a lip seal 4 around the entire inner wall of the hose, formed by another ply of the spiral wrapped body of the hose and one face of which is a continuation of the face of the adjacent recess 3. The lip seal 4 extends away from the inner wall of the hose body obliquely to the wall and in the direction away from the adjacent open end of the hose.

Beyond each lip seal 4 in the direction away from the adjacent end of the hose 1 there is an inwardly directed convolution 5 in the hose which defines an annular groove 6 in the outer wall of the hose and an annular bead 7 projecting into the interior of the hose. A constraining ring 8 is fitted in each groove 6. The bead 7 and lip seal 4 define between them a gap 9.

Each pipe 2 has at its end an outwardly directed annular bead 10 the face of which merges into a frusto-conical end face 10A of the pipe 2.

When the hose 1 is fitted to two lengths of pipe 2, as shown in FIG. 1, each pipe bead 10 engages in the corresponding hose recess 3 and this engagement determines that each lip seal 4 makes face-to-face contact with the corresponding pipe end face 10A with the gap 9 between the seal 4 and the hose bead 7 maintained substantially at full dimension.

When fitted to the lengths of pipe 2 the hose 1 is made fast at each end by a worm drive or other suitable clamp 12 which is tightened around the hose. Alternatively a metal ring can be crimped around the hose to compress it. In each case the securing device is made fast around the end portion of the hose 1 beyond the lip seal 4 and the pipe bead 10 and therefore the clamping action of the clamp or ring has no direct effect on the lip seal 4.

Whilst the clamps 12, or the crimped rings, serve at all times to secure the hose 1 to the lengths of pipe 2, sealing when the interior of the hose and pipes is under pressure is effected by the lip seals 4. The action of this pressure in the gaps 9 between the seals 4 and the hose wall ensures an effective sealing of the seals 4 on the lengths of pipe 2. Substantial increase in internal pressure can be accommodated, with the effectiveness of the seal being enhanced as the internal pressure increases. This pressure is contained at each end of the hose by the hose bead 7 and the pipe bead and end face 10/10A and so the gripping action of the clamps or crimped rings needs only to be sufficient to hold the hose secure against mechanical forces and no significant sealing function has to be performed by these securing devices. Damage to the hose by tightening of the clamps or crimping of the rings is therefore negligeable as significant tightening is not necessary.

The positive location of each hose end on its pipe 2, effected by engagement of the pipe bead 10 in the hose recess 3, assists with correct location of the hose on assembly. Furthermore, the two pipes 2 joined by the hose 1 can move relatively to each other to an extent permitted by flexing of the hose but the engagement of the pipe beads 10 in the hose recesses 3 serves to prevent movement of the hose in the pipes without a need for extensively tightening the securing devices.

Figure 2B:
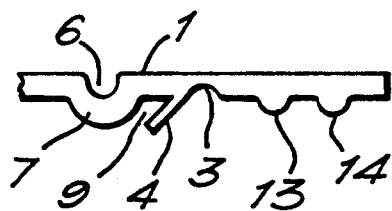
Figure 2C:
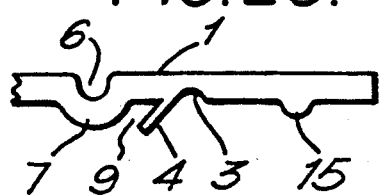

In the alternative form shown in FIG. 2B the hose 1 has two internal beads 13 and 14 in the regions where the clamps 12 are to be fitted. Otherwise the hose is generally as shown in FIGS. 1 and 2A. Likewise in the alternative form shown in FIG. 2C the hose 1 is generally as shown in FIGS. 1 and 2A except that a single bead 15 is provided, internally, in each region where a clamp is to be fitted. The provision of a bead or beads where each clamp is to be fitted further minimizes the extent to which the clamp has to be tightened to achieve satisfactory securing of hose to pipe.

Figure 2D:
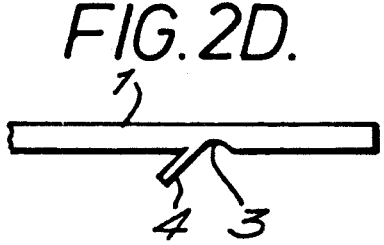

The form shown in FIG. 2D is of a simpler construction for use where it is satisfactory to omit the hose convolutions 5, 5. Otherwise the construction is as described with reference to FIGS. 1 and 2A.

In all the forms described there are utilised the sealing properties of a flexible lip formed within the hose itself and which is deformed by increasing internal pressure to seal against the end face of the hollow member on which the hose end is fitted. Sealing of the hose on the hollow member is not dependant on the force of clamping or crimping and the lip is not subjected to interference by, or damage from, the clamping or crimping forces.

A particular application of the flexible hoses and the hollow members to which they are fittable that have been described above is in turbocharged motor vehicle engine installations, connecting turbocharger/intercooler systems to the engine intake system.

Typically in known hoses not provided with a lip seal as described above, fixing clamps will be tightened to torque figures of 5 to 7 N/m on assembly. After some hours of running the clamp will then need to be re-tightened as the hose settles and suffers varying degrees of compression set. Further tightening of the clamps may also be needed at albeit infrequent times in the future.

By providing the lip seal herein described it is necessary to tighten the clamps to only about 2 to 3 N/m torque and there is no need to re-tighten subsequently. Such low torque settings minimize damage to the hose in the assembly operation. Also the hose is much more able to withstand clamps applied not at right angles to the pipework but at some other angle. In these latter instances high torque settings on the clamps can lead to the clamps biting into part of the hose circumference and causing premature failures.

What is claimed is:

1. A hose and hollow member arrangement in which the hose is fittable at its end over the hollow member, comprising: the hollow member having an annular projection, the hose having an inner wall and an annular recess in this wall to receive and matingly engage the annular projection of the hollow member and beyond this recess in the direction away from the end of the hose a lip seal extending circumferentially all around the inner wall of the hose, said lip seal extending away from the inner wall obliquely in the direction away from said end of the hose, engagement of the lip seal and a radially projecting end face of the hollow member leaving a gap between opposing faces of the inner wall of the hose and the lip seal.

2. A hose and hollow member arrangement as claimed in claim 1, wherein said end face of the hollow member is frusto-conical.

3. A hose and hollow member arrangement as claimed in claim 1, wherein the face of the annular projection of the hollow member merges into said end face of the hollow member.

4. A hose and hollow member arrangement as claimed in claim 1, wherein beyond said lip seal in the direction away from said end of the hose there is an inwardly directed convolution in the hose, said gap being defined by this convolution and the lip seal.

5. A hose and hollow member arrangement as claimed in claim 4, wherein the convolution defines an annular groove, in the outer wall of the hose, in which a constraining ring is fitted.

* * * * *